United States Patent
Wang et al.

(10) Patent No.: US 6,995,220 B2
(45) Date of Patent: Feb. 7, 2006

(54) ETHYLENE POLYMERIZATION PROCESS

(75) Inventors: Shaotian Wang, Mason, OH (US); Gregory G. Hlatky, Morrow, OH (US)

(73) Assignee: Equistar Chemicals, LP, Houston, TX (US)

(*) Notice: Subject to any disclaimer, the term of this patent is extended or adjusted under 35 U.S.C. 154(b) by 0 days.

(21) Appl. No.: 10/834,425

(22) Filed: Apr. 29, 2004

(65) Prior Publication Data

US 2005/0245700 A1    Nov. 3, 2005

(51) Int. Cl.
  *C08F 4/52* (2006.01)
  *C08F 4/76* (2006.01)
(52) U.S. Cl. .................. 526/172; 526/161; 526/128; 526/129; 526/134; 526/352; 526/348; 526/943; 526/941; 526/901
(58) Field of Classification Search ............. 526/161, 526/172
  See application file for complete search history.

(56) References Cited

U.S. PATENT DOCUMENTS

| | | | |
|---|---|---|---|
| 5,064,802 A | 11/1991 | Stevens et al. | 502/155 |
| 5,153,157 A | 10/1992 | Hlatky et al. | 502/117 |
| 5,198,401 A | 3/1993 | Turner et al. | 502/155 |
| 5,241,025 A | 8/1993 | Hlatky et al. | 526/129 |
| 5,414,180 A | 5/1995 | Geerts et al. | 585/525 |
| 5,495,035 A | 2/1996 | Jordan et al. | 556/1 |
| 5,648,440 A | 7/1997 | Sugano et al. | 526/132 |
| 6,211,311 B1 | 4/2001 | Wang et al. | 526/131 |
| 6,232,260 B1 | 5/2001 | Nagy et al. | 502/155 |
| 6,440,889 B1 | 8/2002 | Tsuie | 502/152 |
| 6,479,609 B1 | 11/2002 | Dall'Occo et al. | 526/352 |
| 6,559,251 B1 | 5/2003 | Wang et al. | 526/127 |
| 6,794,468 B1 * | 9/2004 | Wang | 526/161 |

FOREIGN PATENT DOCUMENTS

| | | |
|---|---|---|
| WO | WO 99/24446 | 5/1999 |
| WO | WO 01/53360 | 7/2001 |

OTHER PUBLICATIONS

Buu-Hoi et al. *J. Chem. Soc*, (1952) 2225.
G. Diamond et al. *J. Am. Chem. Soc*, 118 (1996) 8024.
G. Diamond et al. *Organometallics* 15 (1996) 4045.

* cited by examiner

*Primary Examiner*—David W. Wu
*Assistant Examiner*—Rip A. Lee
(74) *Attorney, Agent, or Firm*—John Tyrell; Jonathan L. Schuchardt

(57) ABSTRACT

A process for polymerizing ethylene is disclosed. The ethylene is polymerized with a catalyst system which comprises an activator and an indeno[2,1-b]indolyl Group 4-6 transition metal complex having open architecture. The process gives polyethylene having a broad molecular weight distribution for improved processability.

15 Claims, No Drawings

ETHYLENE POLYMERIZATION PROCESS

FIELD OF THE INVENTION

This invention relates to a process for polymerizing ethylene in the presence of a catalyst system which comprises an activator and an indeno[2,1-b]indolyl Group 4-6 transition metal complex having open architecture.

BACKGROUND OF THE INVENTION

While Ziegler-Natta catalysts are a mainstay for polyolefin manufacture, single-site (metallocene and non-metallocene) catalysts represent the industry's future. These catalysts are often more reactive than Ziegler-Natta catalysts, and they produce polymers with improved physical properties. The improved properties include reduced low molecular weight extractables, enhanced incorporation of α-olefin comonomers, lower polymer density, controlled content and distribution of long-chain branching, and modified melt rheology and relaxation characteristics. Single-site catalysts typically give narrow molecular weight distribution, which can improve some properties but often is detrimental to processability.

Single-site olefin polymerization catalysts having "open architecture" are generally known. Examples include the so-called "constrained geometry" catalysts developed by scientists at Dow Chemical Company (see, e.g., U.S. Pat. No. 5,064,802), which have been used to produce a variety of polyolefins. "Open architecture" catalysts differ structurally from ordinary bridged metallocenes, which have a bridged pair of pi-electron donors. In open architecture catalysts, only one group of the bridged ligand donates pi electrons to the metal; the other group is sigma bonded to the metal. An advantage of this type of bridging is thought to be a more open or exposed locus for olefin complexation and chain propagation when the complex becomes catalytically active. Simple examples of complexes with open architecture are tert-butylamido(cyclopentadienyl)dimethylsilyl-zirconium dichloride and methylamido(cyclopentadienyl)-1,2-ethanediyl-titanium dimethyl:

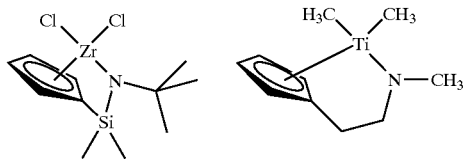

Organometallic complexes that incorporate "indenoindolyl" ligands are known (see U.S. Pat. No. 6,232,260 and PCT Int. Appl. WO 99/24446 ("Nifant'ev")). The '260 patent demonstrates the use of non-bridged bis(indenoindolyl) complexes for making HDPE in a slurry polymerization. Versatility is an advantage of the complexes; by modifying the starting materials, a wide variety of indenoindolyl complexes can be prepared. "Open architecture" complexes are neither prepared nor specifically discussed. Nifant'ev teaches the use of bridged indenoindolyl complexes as catalysts for making polyolefins, including polypropylene, HDPE, and LLDPE. The complexes disclosed by Nifant'ev do not have open architecture.

PCT Int. Appl. WO 01/53360 (Resconi et al.) discloses indeno[2,1-b]indolyl complexes having open architecture and their use to produce substantially amorphous propylene-based polymers. There are no measurements of molecular weight distribution of these propylene polymers and there is no indication that indeno[2,1-b]indolyl complexes having open architecture can be used to produce polyethylene or polypropylene with broad molecular weight distribution.

U.S. Pat. No. 6,559,251 discloses a process for copolymerizing ethylene with at least one alpha-olefin selected from the group consisting of 1-butene, 1-hexene, and 1-octene in the presence of a catalyst system which comprises an activator and a silica-supported, indenoindolyl Group 4-6 transition metal complex having open architecture to produce an ethylene copolymer having a density less than about 0.910 g/cm$^3$. While both indeno[1,2-b]indolyl and indeno[2,1-b]indolyl open architecture complexes are disclosed, no comparative results are given. Nor is there any indication that indeno[2,1-b]indolyl complexes having open architecture can be used to produce polyethylene with broad molecular weight distribution. The molecular weight distributions reported in the examples are all narrow, varying from 2.8 to 3.1.

Pending application Ser. No. 10/638,592 filed Aug. 11, 2003 discloses a process for polymerizing ethylene with open architecture complexes containing an indenoindolyl ligand linked to a $C_6$–$C_{20}$ alkylamido ligand. The only polymerization results reported are with indeno[1,2-b]indolyl complexes, and there is no indication that indeno[2,1-b]indolyl complexes having open architecture can be used to produce polyethylene with broad molecular weight distribution.

Despite the considerable work done in this area, there is much that is not understood. There is a continued need for improved catalysts for ethylene polymerizations. In particular, there is a need for a process that uses single-site catalysts but still makes polyethylenes with broad molecular weight distribution and correspondingly good processability.

U.S. Pat. No. 6,479,609 teaches the use of a multi-stage process and single-site catalysts to make polyethylene with broad molecular weight distribution. This process is complicated and requires more equipment than a standard polymerization. They note that prior art taught mixtures of catalytic systems in a one-stage polymerization but that this has many drawbacks. In particular, the catalyst feed rate is difficult to control and the polymer particles produced are not uniform in size; segregation of the polymer during storage and transfer usually produces non-homogeneous products. Thus, there remains a need for a simple process to make polyethylene with broad molecular weight distribution.

SUMMARY OF THE INVENTION

The invention is a process for polymerizing ethylene. The polymerization is done in the presence of a catalyst system which comprises an activator and an indeno[2,1-b]indolyl Group 4-6 transition metal complex having open architecture. Surprisingly, the indeno[2,1-b]indolyl complex gives polyethylenes with much broader molecular weight distribution than those made from its counterpart indeno[1,2-b]indolyl complex.

DETAILED DESCRIPTION OF THE INVENTION

Catalyst systems useful for the process comprise an activator and an indeno[2,1-b]indolyl Group 4-6 transition metal complex having open architecture. More preferred complexes include a Group 4 transition metal such as titanium or zirconium.

"Indenoindolyl" ligands are generated by deprotonating an indenoindole compound using a potent base. By "indenoindole compound," we mean an organic compound that has both indole and indene rings. The five-membered rings from each are fused, i.e., they share two carbon atoms. Suitable ring systems include those in which the indole nitrogen and the sp$^3$-hybridized carbon of the indene are beta to each other, i.e., they are on the same side of the molecule. This is an indeno[2,1-b]indole ring system:

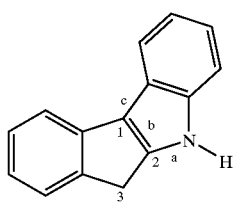

The ring atoms can be unsubstituted or substituted with one or more groups such as alkyl, aryl, aralkyl, halogen, silyl, nitro, dialkylamino, diarylamino, alkoxy, aryloxy, thioether, or the like. Additional fused rings can be present, as long as an indenoindole moiety is present.

Numbering of indenoindoles follows IUPAC Rule A-22. The molecule is oriented as shown below, and numbering is done clockwise beginning with the ring at the uppermost right of the structure in a manner effective to give the lowest possible number to the heteroatom. Thus, 5,6-dihydroindeno[2,1-b]indole is numbered as follows:

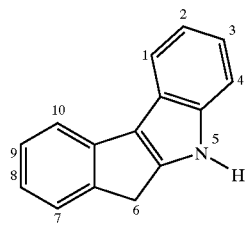

For correct nomenclature and numbering of these ring systems, see the *Ring Systems Handbook* (1998), a publication of Chemical Abstracts Service, Ring Systems File II: RF 33986-RF 66391 at RF 58952 and 58955. (Other examples of correct numbering appear in PCT Int. Appl. WO 99/24446 and U.S. Pat. No. 6,440,889.)

Methods for making indenoindole compounds are well known. Suitable methods and compounds are disclosed, for example, in U.S. Pat. No. 6,232,260, the teachings of which are incorporated herein by reference, and references cited therein, including the method of Buu-Hoi and Xuong, *J. Chem. Soc.* (1952) 2225. Suitable procedures also appear in PCT Int. Appls. WO 99/24446 and WO 01/53360.

The indolyl nitrogen of each indenoindolyl group is typically substituted with an alkyl, aryl, dialkylboryl, trialkylsilyl, or a divalent linking group. For examples of [2,1-b] complexes, see PCT Int. Appl. WO 01/53360 (Resconi et al.).

Indeno[2,1-b]indolyl complexes useful for the process of the invention have open architecture. By "open architecture," we mean a complex having a fixed geometry that enables generation of a highly exposed active site when the catalyst is combined with an activator. The metal of the complex is pi-bonded to the indenyl Cp ring and is also sigma-bonded through two or more atoms to the indenyl methylene carbon. (In contrast, many of the bridged indenoindolyl complexes described in the literature have a transition metal that is pi-bonded to the indenyl Cp ring and pi-bonded to another Cp-like group. See, e.g., U.S. Pat. No. 6,232,260 or WO 99/24446).

The metal is sigma-bonded to nitrogen. The nitrogen is linked to the indenoindolyl group through a bridging group, which is preferably dialkylsilyl, diarylsilyl, methylene, ethylene, isopropylidene, diphenylmethylene, or the like. Particularly preferred bridging groups are dimethylsilyl, methylene, ethylene, and isopropylidene. The bridging group is covalently bonded to the indenyl methylene carbon.

In addition to the bridged indeno[2,1-b]indolyl ligand, the organometallic complex usually includes one or more labile anionic ligands such as halides, alkoxys, aryloxys, alkyls, alkaryls, aryls, dialkylaminos, or the like. Particularly preferred are halides, alkyls, and alkaryls (e.g., chloride, methyl, benzyl).

In a preferred process of the invention, the indeno[2,1-b]indolyl complex has the general structure:

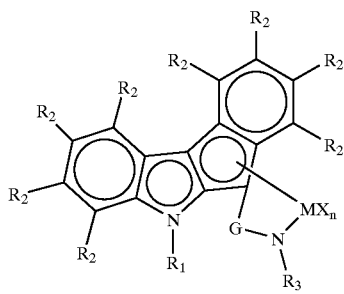

in which $R_1$ is selected from the group consisting of $C_1$–$C_{30}$ hydrocarbyl, $C_1$–$C_6$ halocarbyl, $C_1$–$C_{30}$ halohydrocarbyl, and trialkylsilyl; each $R_2$ is independently selected from the group consisting of $R_1$, H, F, Cl, Br, and $C_1$–$C_6$ alkoxy; $R_3$ is $C_1$–$C_5$ hydrocarbyl; G is a divalent radical selected from the group consisting of hydrocarbyl and heteroatom-containing alkylene radicals, diorgano silyl radicals, diorgano germanium radicals, and diorgano tin radicals; M is a Group 4 to 6 transition metal; each X is independently selected from the group consisting of halide, alkoxy, siloxy, alkylamino, and $C_1$–$C_{30}$ hydrocarbyl, and n satisfies the valence of M.

Exemplary organometallic complexes useful for the process of the invention:

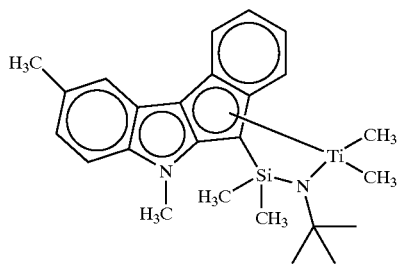

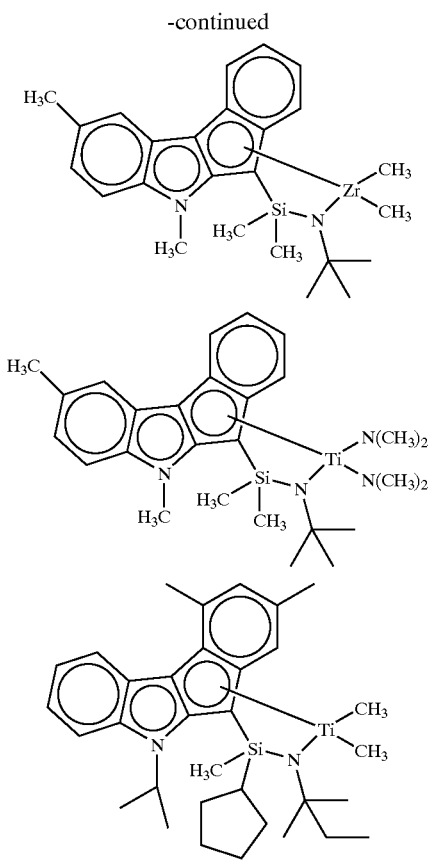

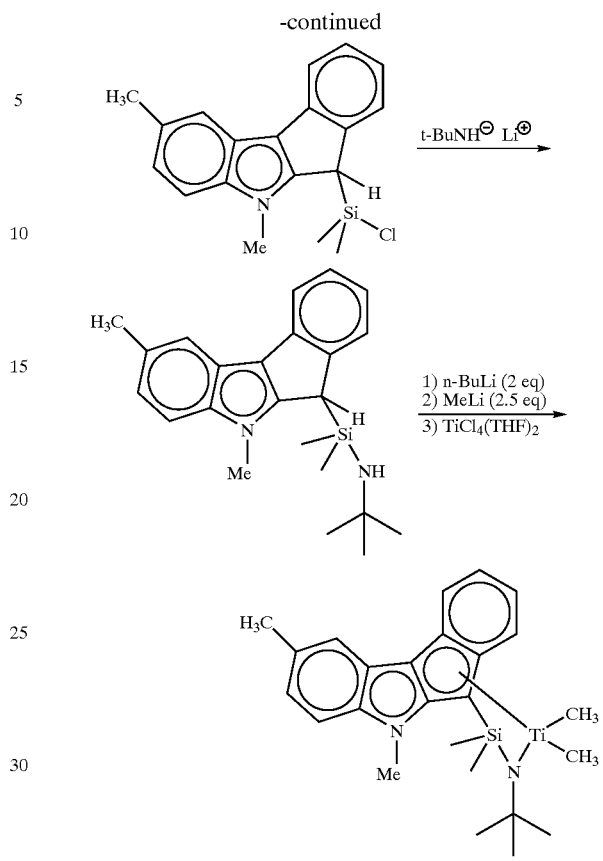

The complexes can be made by any suitable method; those skilled in the art will recognize a variety of acceptable synthetic strategies. The indeno[2,1-b]indolyl complexes are conveniently made from the 2-indanone precursors. For synthesis of indeno[2,1-b]indolyl complexes, see especially PCT Int. Appl. WO 01/53360 for suitable routes. Often, the synthesis begins with preparation of the desired indeno[2,1-b]indole compound from particular 2-indanone and arylhydrazine precursors. In one convenient approach, the indenoindole is deprotonated and reacted with dichlorodimethylsilane to attach a chlorodimethylsilyl group to the indenyl methylene carbon. Subsequent reaction with an amine or, more preferably, an alkali metal amide compound such as lithium tert-butylamide (from tert-butylamine and n-butyllithium), displaces chloride and gives the desired silylamine product. Double deprotonation and reaction with a transition metal source gives the target indenoindolyl metal complex having open architecture. A typical reaction sequence follows:

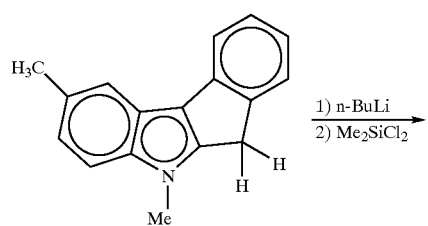

A similar complex can be generated by amine elimination, which may or may not require heating, with a method explored by Professor Richard F. Jordan and coworkers at the University of Iowa:

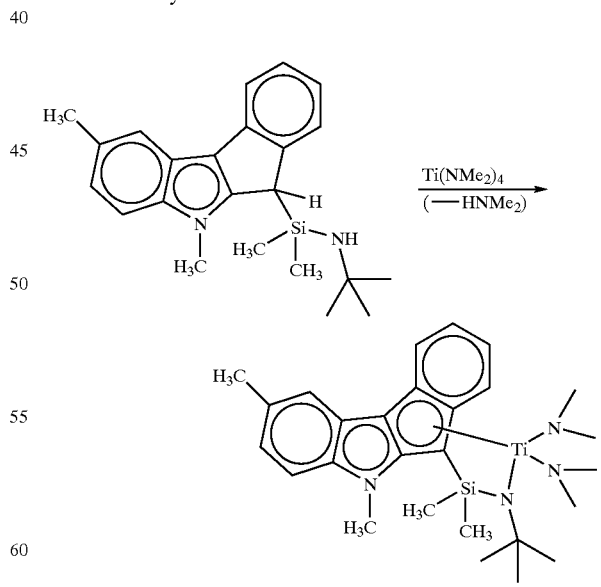

For additional examples of this approach to making organometallic complexes, see U.S. Pat. No. 5,495,035; *J. Am. Chem. Soc.* 118 (1996) 8024; and *Organometallics* 15 (1996) 4045.

Similar strategies can be used to make a wide variety of indeno[2,1-b]indolyl metal complexes having open architecture.

Any convenient source of the transition metal can be used to make the complex. As shown above, the transition metal source conveniently has labile ligands such as halide or dialkylamino groups that can be easily replaced by the indenoindolyl and amido anions of the bridged indenoindolyl ligand. Examples are halides (e.g., $TiCl_4$, $ZrCl_4$), alkoxides, amides, and the like.

Catalyst systems useful in the process include, in addition to the indenoindolyl metal complex, an activator. The activator helps to ionize the organometallic complex and activate the catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutyl aluminum), and the like. Suitable activators include acid salts that contain non-nucleophilic anions. These compounds generally consist of bulky ligands attached to boron or aluminum. Examples include lithium tetrakis(pentafluorophenyl)borate, lithium tetrakis(pentafluorophenyl)-aluminate, anilinium tetrakis(pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl) borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference. Suitable activators also include aluminoboronates—reaction products of alkyl aluminum compounds and organoboronic acids—as described in U.S. Pat. Nos. 5,414,180 and 5,648,440, the teachings of which are incorporated herein by reference. Alumoxane activators, such as MAO, are preferred.

The optimum amount of activator needed relative to the amount of organometallic complex depends on many factors, including the nature of the complex and activator, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 10 to about 500 moles, and more preferably from about 10 to about 200 moles, of aluminum per mole of transition metal, M. When the activator is an organoborane or an ionic borate or aluminate, the amount used will be within the range of about 0.01 to about 5000 moles, preferably from about 0.1 to about 500 moles, of activator per mole of M. The activator can be combined with the complex and added to the reactor as a mixture, or the components can be added to the reactor separately.

Preferably, the complex is immobilized on a support. The support is preferably a porous material such as inorganic oxides and chlorides, and organic polymer resins. Preferred inorganic oxides include oxides of Group 2, 3, 4, 5, 13, or 14 elements. Preferred supports include silica, alumina, silica-aluminas, magnesias, titania, zirconia, magnesium chloride, and crosslinked polystyrene. Most preferred is silica. The silica is preferably treated thermally, chemically, or both prior to use to reduce the concentration of surface hydroxyl groups. Thermal treatment consists of heating (or "calcining") the silica in a dry atmosphere at elevated temperature, preferably greater than about 100° C., and more preferably from about 150 to about 600° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference.

Many types of polymerization processes can be used. The process can be practiced in the gas phase, bulk, solution, or slurry. The polymerization can be performed over a wide temperature range. Generally, lower temperatures give higher molecular weight and longer catalyst lifetimes. However, since the polymerization is exothermic, lower temperatures are more difficult and costly to achieve. A balance must be struck between these two factors. Preferably, the temperature is within the range of about 0° C. to about 150° C. A more preferred range is from about 20° C. to about 90° C.

Catalyst concentrations used for the olefin polymerization depend on many factors. Preferably, however, the concentration ranges from about 0.01 micromoles per liter to about 100 micromoles per liter. Polymerization times depend on the type of process, the catalyst concentration, and other factors. Generally, polymerizations are complete within several seconds to several hours.

The polyethylene has high molecular weight and broad molecular weight distribution. By "broad molecular weight distribution," we mean the polydispersity ($M_w/M_n$) is greater than about 4.0. The $M_w$ and $M_w/M_n$ can be measured by gel permeation chromatography. Their values can affect polymer properties such as elasticity. Generally, the elastic properties such as tensile set and stress recovery improve with increasing molecular weight. The $M_w$ is typically greater than 100,000. Generally, the processability improves as the polydispersity increases. The polydispersity is preferably greater than about 4.0 to about 10.0, preferably from about 5.0 to about 8.0.

The following examples merely illustrate the invention. Those skilled in the art will recognize many variations that are within the spirit of the invention and scope of the claims.

Open Architecture Indeno[1,2-b]indolyl Complex 4

(a) Preparation of Indeno[2-b]indole 1. A mixture of 1-indanone (30.6 g, 232 mmol) and p-tolylhydrazine hydrochloride (37.0 g, 233 mmol) in ethanol (350 mL) and aqueous HCl (12 N, 18 mL) is heated to reflux for 90 min. The mixture is cooled and filtered, and the solid is washed with ethanol (600 mL) followed by 20% aqueous ethanol (400 mL) and finally hexanes (200 mL). The off-white solid is dried under vacuum (36.5 g, 72%).

(b) N-Methylation of 1. A mixture of 1 (36.5 g, 166 mmol), aqueous NaOH solution (112 mL, 20 M, 2.2 mol), $C_{16}H_{33}NMe_3Br$ (0.65 g, 1.78 mmol), and toluene (112 mL) is vigorously stirred at room temperature. A solution of methyl iodide (17.0 mL, 273 mmol) in toluene (15 mL) is added dropwise, and the mixture is stirred at room temperature for 4 h and refluxed for 3 h. A crystalline solid forms upon cooling and is filtered and washed with cold (−78° C.) ethanol (300 mL) followed by hexanes (100 mL). The layers are separated and the aqueous fraction is washed with toluene (2×100 mL). The organics are combined and dried over $Na_2SO_4$ and filtered. The volatiles are removed under vacuum and the precipitate is dried and combined with the crystalline product 2 (total yield 25.7 g, 66%).

(c) Bridged ligand preparation (3). n-Butyllithium (8 mL, 2.5 M in hexane, 20 mmol) is added dropwise to a solution of 2 (4.66 g, 21 mmol) in dry ether (70 mL). After 2 h, this solution is slowly added to a solution of dichlorodimethylsilane (5.20 g) in ether (30 mL). After 2 h of stirring at room temperature, the mixture is filtered and evaporated. The residue is redissolved in ether (60 mL), and an ethereal solution of lithium t-butylamide (prepared in the usual manner from t-butylamine (1.46 g) and n-butyllithium (8 mL of 2.5 M solution)) is added dropwise. The mixture is stirred for 3 h, and is then filtered through Celite filter aid. After concentrating the filtrate, the residue is collected with pentane and chilled to −30° C. Yield of bridged ligand 3: 6 g (82%).

(d) Preparation of open architecture indeno[1,2-b]indolyl complex 4. Bridged ligand 3 (6 g) is dissolved in ether (120 mL) and n-butyllithium (13.5 mL of 2.5 M solution in hexane) is added. After stirring overnight at room temperature, methyllithium (24.5 mL of 1.4 M solution in ether) is added, and the mixture is cooled to −30° C. Titanium tetrachloride bis(tetrahydrofuran) complex (5.66 g) is added, and stirring continues for 3 h. The mixture is filtered and the filtrate is concentrated. The residue is extracted with hot heptane (2×100 mL). The combined filtrates are evaporated, and the residue is crystallized with pentane and cooled to −30° C. The product, complex 4, is a dark brown solid. Yield: 4.67 g. The $^1$H NMR spectrum is consistent with the proposed structure:

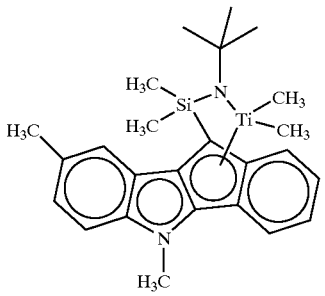

Open Architecture Indeno[2,1-b]indolyl Complex 6

This compound is prepared from 2-indanone substantially according to the procedure detailed in PCT Int. Appl. WO 01/53360 Example 1 to yield open architecture indeno[2,1-b]indolyl complex 6.

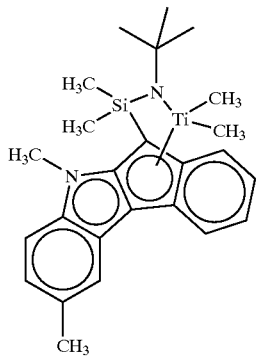

Preparation of Silica-Supported Complexes 4 and 6

Grace Davison 955 silica is calcined at 250° C. for 12 h. In a glove-box under nitrogen, a 30 wt. % solution of methylalumoxane (MAO) in toluene (0.8 mL) is slowly added to a sample (1.0 g) of the calcined silica at room temperature with efficient stirring. After the MAO addition is complete, stirring continues for 0.5 h. Volatiles are removed under vacuum (about 28.5 inches Hg, 1 hour) at room temperature. Yield: 1.30 g of MAO-treated silica.

Also in the glove-box, 30 wt. % MAO/toluene solution (1.18 mL) is diluted with toluene (3.4 mL), and an amount of open architecture titanium complex (4 or 6) equal to 0.048 mmol of titanium is then added to the diluted MAO to form a solution. This resulting solution is then mixed with the dry, MAO-treated silica described above. After stirring for an additional 0.5 h, the supported complex is dried under vacuum to give a supported complex (about 1.80 g).

EXAMPLE 1

Copolymerization of Ethylene and 1-Hexene

A one-liter, stainless-steel reactor is charged with 1-hexene (15 mL). Triisobutylaluminum (0.5 mL of 1.0 M solution in heptane, 0.5 mmol) and Stadis 425 additive (12 mg, product of Octel-Starreon) in heptane solution (3.0 mL) are mixed in one sidearm of the injector. This mixture is then flushed into the reactor with nitrogen pressure and isobutane (about 410 mL). Hydrogen is added (4.1 delta MPa from a 10-mL stainless-steel cylinder pressurized initially to 4.5 MPa $H_2$) to the reactor, which is then pressurized with ethylene to 2.4 MPa. The reactor contents are allowed to equilibrate at 75° C. Complex 6, supported on silica, as described above (55–60 mg), is loaded into the other injector arm and then flushed into the reactor with isobutane (75 mL) and nitrogen pressure. The polymerization proceeds for 0.5 hour. The reactor is vented and the polyolefin copolymer is collected and dried. Catalyst activity is 260 kg polyolefin per g titanium per hour. The weight average ($M_w$) molecular weight and polydispersity ($M_w/M_n$) of the polymer are measured by gel permeation chromatography (GPC) using 1,3,5-trichlorobenzene at 145° C. to be 73,800 and 5.79. The melt index (MI) and melt index ratio (MIR) are measured according to ASTM D1238, Condition E to be 8.2 dg/min and 35.3. The density is determined according to ASTM D-1505-96 to be 0.917 g/cm$^3$. Rheological testing is done according to ASTM D4440-95A. ER is one of the elasticity parameters measured and is determined to be 1.45.

COMPARATIVE EXAMPLE 2

The polymerization procedure of Example 1 is generally followed with silica-supported complex 4 substituted for silica-supported complex 6. The results of the two polymerizations are summarized in Table 1.

TABLE 1

| Example | Complex | $M_w/M_n$ | Activity [kg/g · Ti · h] | $MI_2$ | MIR | $M_w$ | Density | $E_R$ |
|---|---|---|---|---|---|---|---|---|
| 1 | 6 (2, 1-b) | 5.79 | 260 | 8.2 | 35.3 | 73,800 | 0.917 | 1.45 |
| C-2 | 4 (1, 2-b) | 3.05 | 850 | 10.3 | 20.9 | 64,200 | 0.917 | 0.35 |

Example 1 shows that polymerizations performed with open architecture, indeno[2,1-b]indolyl complexes give polymers with much broader $M_w/M_n$ versus those made in Comparative Example 2 performed with the open architecture, indeno[1,2-b]indolyl complex. This broad $M_w/M_n$ is expected to give improved processability.

The preceding examples are meant only as illustrations. The following claims define the invention.

The invention claimed is:

1. A process which comprises polymerizing ethylene in the presence of a catalyst system which comprises an activator and a Group 4-6 transition metal complex having open architecture wherein the complex comprises an indeno [2,1-b]indolyl ligand linked to a $C_1$–$C_5$ alkylamido ligand to produce polyethylene having a $M_w/M_n$ greater than about 4.0 and a density greater than 0.910 g/cm$^3$.

2. The process of claim 1 wherein the complex is a Group 4 transition metal complex.

3. The process of claim 1 wherein the activator is selected from the group consisting of alumoxanes, alkylaluminum compounds, organoboranes, ionic borates, ionic aluminates, aluminoboronates, and mixtures thereof.

4. The process of claim 1 wherein ethylene is copolymerized with at least one olefin.

5. The process of claim 4 wherein the olefin is selected from the group consisting of propylene, 1-butene, 1-hexene, and 1-octene.

6. The process of claim 1 wherein the Group 4-6 transition metal complex has the structure:

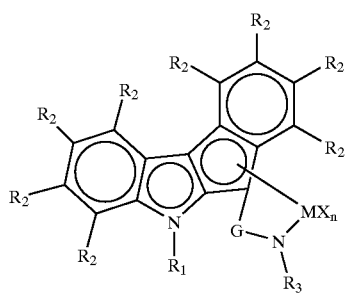

in which $R_1$ is selected from the group consisting of $C_1$–$C_{30}$ hydrocarbyl, $C_1$–$C_6$ halocarbyl, $C_1$–$C_{30}$ halohydrocarbyl, and trialkylsilyl; each $R_2$ is independently selected from the group consisting of $R_1$, H, F, Cl, Br, and $C_1$–$C_6$ alkoxy; $R_3$ is $C_1$–$C_5$ hydrocarbyl; G is a divalent radical selected from the group consisting of hydrocarbyl and heteroatom-containing alkylene radicals, diorgano silyl radicals, diorgano germanium radicals, and diorgano tin radicals; M is a Group 4 to 6 transition metal; each X is independently selected from the group consisting of halide, alkoxy, siloxy, alkylamino, and $C_1$–$C_{30}$ hydrocarbyl and n satisfies the valence of M.

7. The process of claim 6 wherein M is a Group 4 transition metal and G is dialkylsilyl.

8. The process of claim 7 wherein M is Ti or Zr, $R_3$ is t-butyl, G is dimethylsilyl and X is halide or alkyl.

9. The process of claim 1 wherein the polyethylene has a $M_w/M_n$ from about 5.0 to about 8.0.

10. The process of claim 1 wherein the polymerization is performed at a temperature within the range of about 20° C. to about 90° C.

11. The process of claim 1 wherein the complex is supported.

12. The process of claim 11 wherein the complex is supported on silica.

13. A slurry polymerization process of claim 1.

14. A gas-phase polymerization process of claim 1.

15. A solution polymerization process of claim 1.

* * * * *